Figure 1:
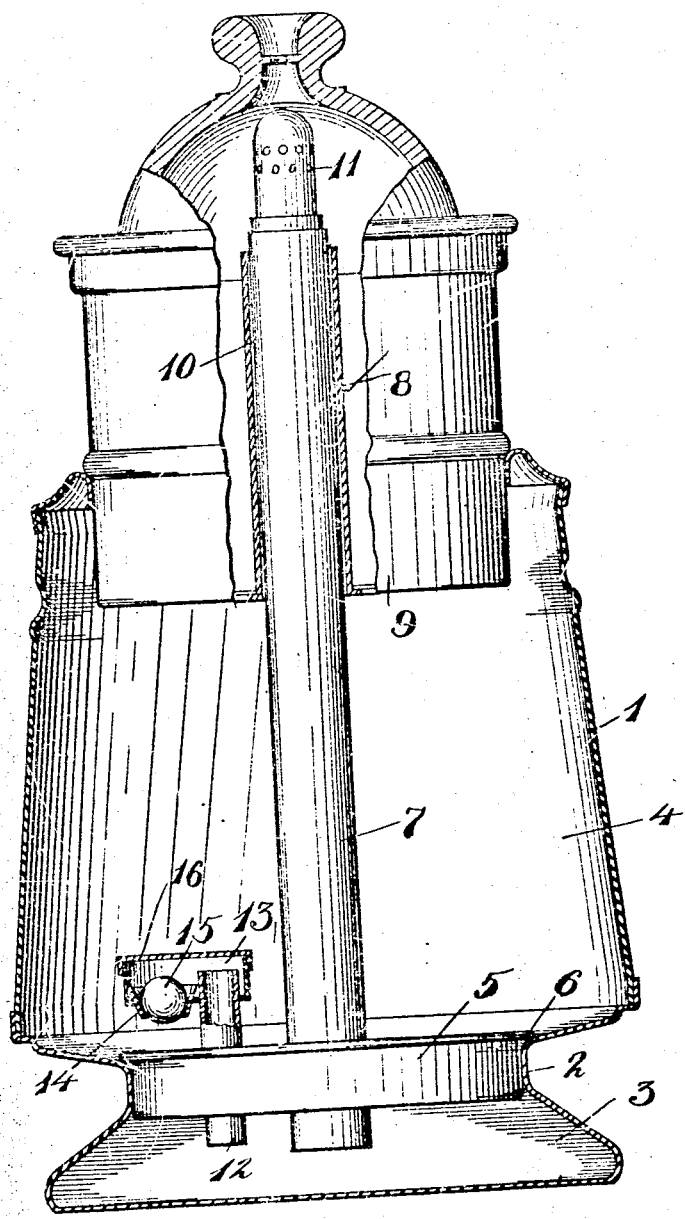

J. W. CHAPMAN.
VALVED PERCOLATOR POT.
APPLICATION FILED JUNE 27, 1908.

956,481.

Patented Apr. 26, 1910.
3 SHEETS—SHEET 1.

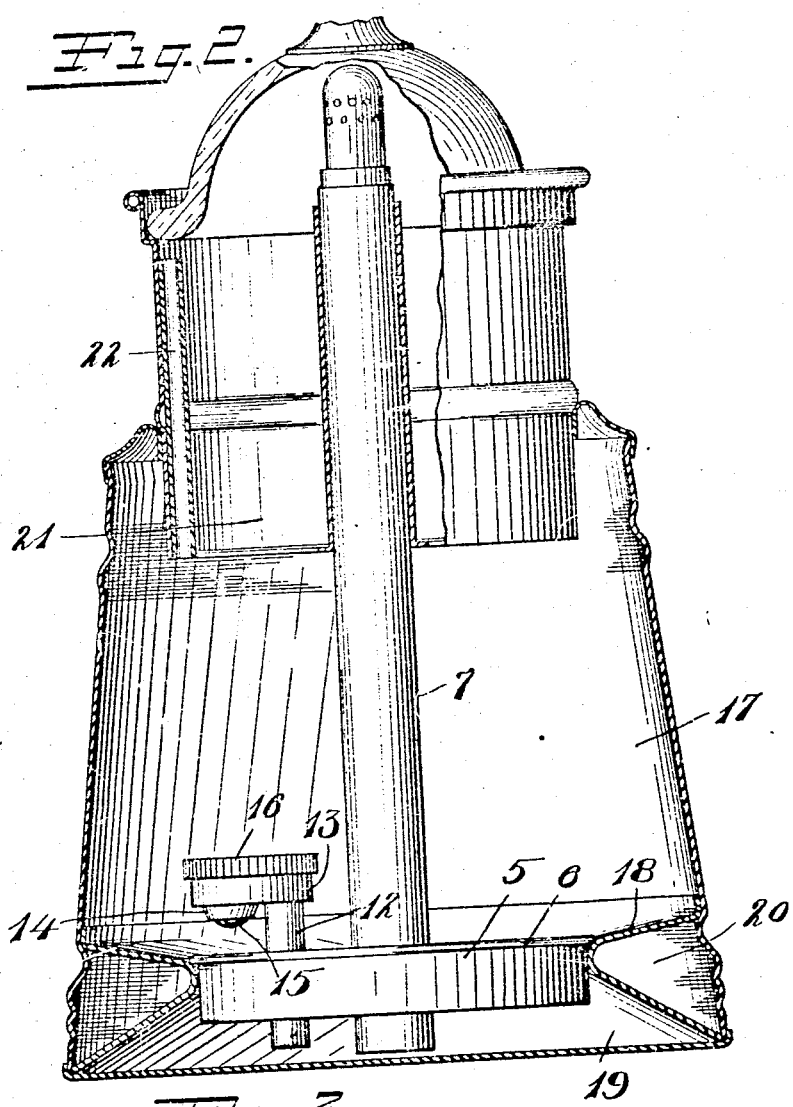

J. W. CHAPMAN.
VALVED PERCOLATOR POT.
APPLICATION FILED JUNE 27, 1908.
956,481.
Patented Apr. 26, 1910.
3 SHEETS—SHEET 3.
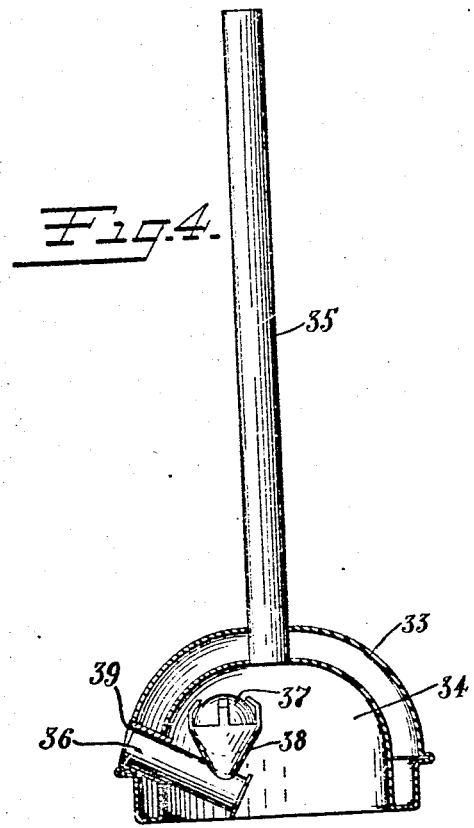
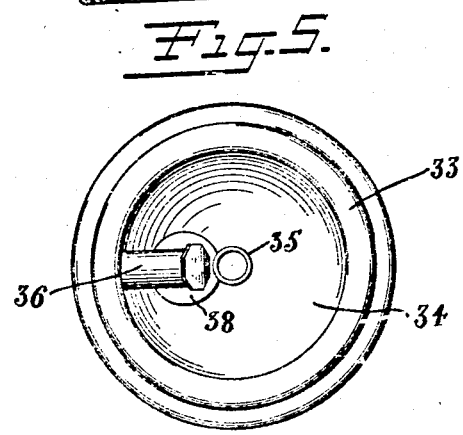
Witnesses:
Inventor
J. W. CHAPMAN.

UNITED STATES PATENT OFFICE.

JAMES W. CHAPMAN, OF MERIDEN, CONNECTICUT, ASSIGNOR TO MANNING, BOWMAN & COMPANY, OF MERIDEN, CONNECTICUT, A CORPORATION OF CONNECTICUT.

VALVED PERCOLATOR-POT.

956,481.   Specification of Letters Patent.   Patented Apr. 26, 1910.

Application filed June 27, 1908. Serial No. 440,651.

*To all whom it may concern:*

Be it known that I, JAMES W. CHAPMAN, a citizen of the United States, residing at Meriden, county of New Haven, State of Connecticut, have invented certain new and useful Improvements in Valved Percolator-Pots, of which the following is a full, clear, and exact description.

My invention relates to improvements in so-called percolator coffee pots, and is particularly concerned with means whereby speed of operation may be increased and coffee may be produced with the least expenditure of heat.

Preferred embodiments of my invention are illustrated in the accompanying drawings, in which, Figure 1 is a vertical section of a coffee pot provided with my improvements. Fig. 2 is a similar view of a modified form of pot. Fig. 3 is a fragmentary view of a portion of a pot illustrating a still further modification. Fig. 4 is a view of a modified arrangement of a valve embodying my invention. Fig. 5 is an under side view of the parts shown in Fig. 4.

In the embodiments of my invention herein selected for illustration and referring particularly to Fig. 1, 1 indicates the coffee pot proper, which, in the form here shown, is provided with the spun-in neck 2, forming a lower heating chamber 3, which is partially separated from the main containing chamber 4 by said neck 2. Within the neck 2 is fitted what may be called a bell or cover 5, having a flange 6 which overlies the upper portion of the neck 2. This cover serves to effectually separate or shut off the heating chamber 3 from the main chamber 4, and inasmuch as said cover is formed in the shape of a closed air chamber, the liquid contained in the main chamber 4 is insulated from the heating chamber 3. The cover 5 is provided with a percolator tube 7 which extends up through the body of the vessel and through a sleeve 8 secured to the base of the drip chamber 9, within which sleeve 8 the percolator tube has a loose fit, providing an overflow passage 10 between the tube and sleeve, through which excess of liquid in the drip chamber may be returned to the main chamber 4. The percolator tube is also provided at its upper end with apertures 11, through which the heated liquid may flow over and upon the coffee contained within the drip chamber 9.

In the operation of percolator pots heretofore constructed, great difficulty has been experienced in preventing the heated liquid from the heating chamber 3 from flowing back into the main chamber 4, rather than up through the percolator tube 7. My invention is designed to effectually prevent such return of the heated liquid to the main chamber by providing an automatic valve between the heating chamber 3 and the main chamber 4. In the embodiment of the invention here shown, communication between the heating chamber 3 and the main chamber 4 is secured through a tube 12, which is preferably mounted upon and extends through the cover 5 and has upon its upper end a valve chamber 13 provided with a valve seat 14, in which is seated a ball-valve 15. A removable cover 16 gives ready access to the valve chamber for cleaning or other purposes.

In the operation of the device, the cover 5 and tube 7 are removed from the pot, and the latter is partially filled with water; thereupon said cover is replaced within the neck 2, thus shutting off a limited body of water within the heating chamber 3 and from the main chamber 4. When heat is applied to the chamber 3, the liquid therein is rapidly raised in temperature. In the initial operation of the device, this liquid is forced by the steam generated in the chamber 3 upwardly through the percolator tube 7 and flows over and upon the coffee in the drip chamber 9, whence it percolates through the coffee and drips into the main chamber, at the same time a portion of the liquid is forced through the inlet tube 12 into the valve chamber 13. The pressure within the chamber 3 and the weight of the valve initially serve to hold the ball-valve against its valve seat 14, until, by reason of the expulsion of the liquid up through the percolator tube 7 by the steam pressure, pressure in the heating chamber 3 is relieved, whereupon the weight of the cooler liquid in the main body 4 serves to raise the ball-valve 15 from its seat and permit a further quantity of such liquid to enter the heating chamber 3 through the inlet tube 12. After passing the valve 15 into the heating chamber, however, the valve acts as a check to prevent return of the liquid to the main chamber, and the only escape, therefore, is through the percolating tube 7. Thus it will be seen that the percolating operation is carried on automatically, and that the entire heating energy is expended in driving the heated liquid up through the percolator tube 7 and without waste of any of said energy in the escape of the heated liquid to the main chamber 1.

In the modified form of the invention illustrated in Fig. 2, instead of forming the body of the pot with a spun-in neck 2, a pot 17 of ordinary construction is employed, within which is soldered or otherwise secured a collar 18, thus forming a heating chamber 19, which is effectually insulated from the main chamber by the air space 20, within the collar 18. The percolating cover tube, inlet tube, and valve chamber are similar in all respects to the corresponding parts illustrated in Fig. 1. In this embodiment of my invention, however, I show a modified form of overflow for the drip chamber 21, which comprises a tube 22 secured at any convenient part of the drip chamber, as the side thereof, through which the excess of liquid from the percolator tube will be returned to the main chamber of the pot.

In the second modification of my invention illustrated in Fig. 3, the heating chamber 23 is formed by spinning down a portion of the bottom plate 24 of the pot, within which chamber is mounted the percolator cover 25, provided with a percolating tube 26, inlet tube 27 and valve chamber 28. For the purpose of securing rapid heating of this form of heating chamber, a solid metal heating plate 29 is secured thereto by means of a boss 30, on said plate, secured within a spun-up projection 31 in the base of the heating chamber. The attachment of the heating plate is such that a considerable air space is left between the body portion thereof and the bottom proper 24, of the pot, thus leaving an air space by which the main chamber of the pot is effectually insulated from the source of heat in a manner similar to that described in the modifications illustrated in Figs. 1 and 2. The cover 25 in this second modification has formed in its base a recess 32, which extends over and around, but out of contact with, the projection 31 formed in the base of the heating chamber 23, whereby the liquid within said chamber is the more rapidly heated and at the same time communication is secured through said heating chamber from the inlet tube 27 to the percolator tube 26. Aside from the means for conveying heat to the heating chamber as by means of the solid plate 29, the operation of this form of my invention is similar to that described for Figs. 1 and 2.

In the modified form of percolator valve and cover shown in Figs. 4 and 5, the cover 33 is substantially the same construction as the form shown in Fig. 3 but is somewhat more arched to form an interior chamber 34 of considerable height with which the percolator tube 35 communicates in the usual manner. The valve member in this modification comprises a tube 36, which affords communication between the main chamber of the pot and the heating chamber 34, through ball-valve 37 resting in the valve seat 38 mounted upon the tube 36. The tube 36 is removably seated in sleeve 39 which is suitably secured in the cover 35, whereby, for cleaning purposes, tube 36 and the valve attached thereto may be readily removed. By this arrangement a very compact construction is secured and one which eliminates the necessity of a valve chamber separate from the heating chamber.

While I have herein shown several forms in which my invention may be embodied, it is to be understood that the same is not limited to these forms, but may be modified in detail as well as arrangement of parts without departing from the spirit or scope of my invention.

What I claim is:

1. In a percolator pot, a main containing chamber, a heating chamber, a cover for said heating chamber having a percolating tube extending therefrom, an inlet pipe passing through said cover and a valve chamber having a valve opening communicating with said pipe and having a valve therein overlying said opening arranged to be closed by gravity and by pressure within said heating chamber.

2. A percolator pot having a main containing chamber, a heating chamber, a cover therefor, a percolating tube extending from said heating chamber, a pipe connecting said chambers and provided with a valve chamber outside of said heating chamber having a valve opening and a valve in said valve chamber overlying said opening and arranged to be closed by gravity and by pressure in said heating chamber.

3. A percolator pot having a main containing chamber, a heating chamber, a cover for said heating chamber having a percolating tube passing therethrough, an inlet pipe extending through said cover and having a valve chamber having a valve opening communicating therewith, and a valve in said valve chamber overlying said opening whereby said valve will be closed by gravity.

4. A percolator pot having a main chamber, a heating chamber, a heating plate attached to the bottom of said heating chamber, and having a boss extending into said heating chamber, a removable cover for said heating chamber, having a domed portion in its base extending over said boss and forming a contracted passage around the same, a percolating tube communicating with said domed portion and means of communication between said heating and main chambers.

5. A percolator pot having a main chamber, a heating chamber, a heating plate attached to the bottom of said heating chamber and having a boss extending into said heating chamber, a removable cover for said heating chamber, comprising a closed air chamber having a domed portion extending over said boss and forming a contracted passage around the same, a percolating tube communicating with said domed portion, and means of communication between said heating and main chambers.

JAMES W. CHAPMAN.

Witnesses:
   A. L. STETSON,
   E. J. POOLEY.